Dec. 20, 1966   B. A. McKEAN   3,292,463
WRENCH ADAPTER
Filed Jan. 10, 1966

INVENTOR
BOYD A. McKEAN
BY
Charles L. Lauchert
atty

United States Patent Office 3,292,463
Patented Dec. 20, 1966

3,292,463
WRENCH ADAPTER
Boyd A. McKean, Fairview, Pa., assignor to Titan Tool Company, Fairview, Pa., a corporation of Pennsylvania
Filed Jan. 10, 1966, Ser. No. 519,493
8 Claims. (Cl. 81—53)

This invention relates to tools and, more particularly, to the type of tool known as stud drivers.

The stud driver disclosed herein is built for rugged use, such as is found in locomotive shops and in plants building heavy air compressors, engines, or similar equipment. The stud driver is provided with a floating sleeve which will endure the severe vibration encountered when used on an impact wrench or the like. The loose bushing incorporated in the stud driver according to the invention provides a much easier release for the stud after it has been driven than previous tools of this type, and thus makes it less likely for the stud to be pulled back out of the casting or other body into which it is driven.

It is, accordingly, an object of the invention to provide an improved stud driver.

Another object of the invention is to provide a stud driver, which is simple in construction, economical to manufacture, and simple and efficient to use.

Another object of the invention is to provide a stud driver having a bushing with an internal single thread and a multiple threaded outside threadably inserted in a holder.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
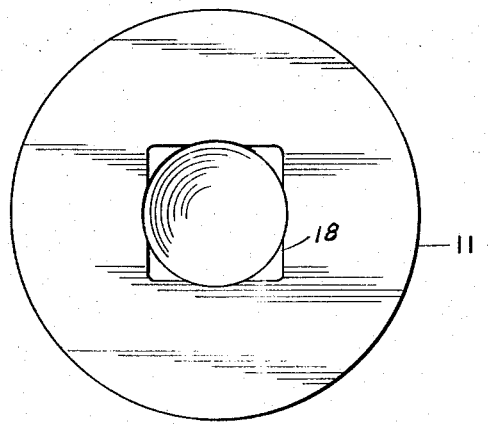

In the drawing:
FIG. 1 is a top view of a stud driver according to the invention; and
FIG. 2 is a longitudinal cross sectional view of the stud driver shown in FIG. 1.

Figure 2:
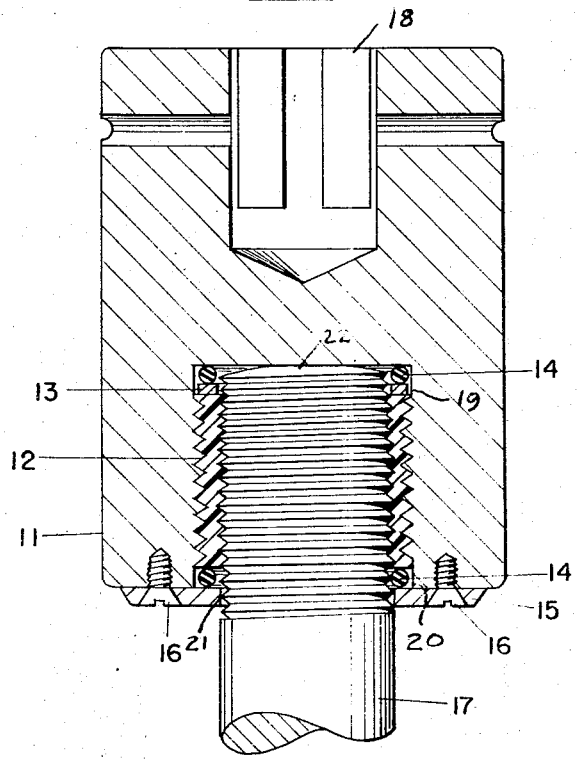

Now with more particular reference to the drawing, the stud driver shown in FIGS. 1 and 2 has a body or holder 11, which may be generally cylindrical and has a threaded blind hole in its first end that receives the threaded bushing 12. The threaded bushing 12 has an external multiple thread, which is threadably received in the blind hole and an internal thread which is adapted to receive a stud 17 to be driven.

The threads in the blind hole are bored out adjacent the inner end thereof forming a cylindrical surface 19 as shown. The resilient O-ring 14 rests on the bottom of the blind hole inside surface 19 and it rests under flat washer 13. The inner end of the bushing 12 rests on the flat washer 13.

The threads at the outer end of the blind hole are bored out forming internal cylindrical surface 20, as indicated, and the resilient O-ring 14 is received between the outer end of the bushing and the inner side surface of the end cap 15. The end cap is in the form of a washer having a hole 21 in the center. The end cap 15 is fixed to the second end of the holder by means of the threaded screws 16 which are countersunk into the end cap 15. It will be noted that the hole 21 in the end cap that receives the stud 17 is of slightly greater diameter than the major diameter of the internal threads of the bushing 12.

The holder 11 has a non-circular hole 18 on the first end remote from the bushing, and the non-circular hole is adapted to receive the shank of an impact wrench or the like.

It will be noted that the holder 11 will not advance on the bushing 12 during impact driving due to the very rapid lead of the multiple external thread on the bushing between the bushing and the holder. It is necessary to provide a means for removing pressure at the point the crown 22 of the stud 17 contacts the bottom of the blind hole in the holder. The stud 17 would otherwise become frozen in the tool and be unscrewed from the work piece when the wrench was reversed.

The very rapid lead of the threads on the inside of the holder 11 and the external threads on bushing 12 makes it possible immediately to start to unscrew the stud from the bushing when reverse rotation of the wrench attached to the holder is provided. Any small amount of separating longitudinal movement between the holder 11 and the bushing 12 will cause all pressure between the crown 22 of the stud 17 and the bottom of the blind hole in the holder to disappear abruptly. This will permit the stud 17 to be unscrewed easily out of the bushing 12.

The two resilient members in the form of O-rings 14 and the end cap 15 keep the bushing 12 in a relatively central location within the threaded hole in the holder 11 prior to the starting of the driving of the stud 17.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A stud driver comprising a holder,
   said holder having attaching means on a first end thereof adapted to be attached to a rotatable member having means on the first end of the holder to rotate said holder in a first forward direction and means to rotate said holder in a second reverse direction,
   a threaded hole formed in the second end of said holder remote from said first end,
   a hollow bushing,
   said bushing having an external thread on its outside surface threadably received in said threaded hole,
   means to limit the movement of a stud into said hole,
   an internal thread on the inside of said bushing,
   first resilient means limiting the movement of said bushing in said forward direction,
   one of said external thread and said internal thread being of a lower pitch than the other,
   and second resilient means limiting the movement of said bushing in said reverse direction.
2. The stud driver recited in claim 1 wherein
   said external thread on said bushing is a multiple thread.
3. The stud driver recited in claim 1 wherein
   said first resilient means comprises a resilient washer.
4. The stud driver recited in claim 3 wherein
   said hole is a blind hole and said washer is disposed at the bottom of said blind hole.
5. The stud driver recited in claim 4 wherein
   a rigid washer is disposed between said resilient washer and the end of said bushing.
6. The stud driver recited in claim 5 wherein
   said second resilient means comprises a second resilient washer, and an end cap attached to said second end of said bushing, said end cap having an opening in the center thereof adapted to receive a stud to be driven, said opening being slightly larger than the major diameter of said internal threads in said bushing, said second resilient washer being disposed between said end cap and said second end of said bushing.

7. The stud driver recited in claim 6 wherein said end cap is attached to said holder by means of spaced studs.

8. The stud driver recited in claim 1 wherein said one of said external and said internal thread is a multiple pitch thread.

References Cited by the Examiner

UNITED STATES PATENTS

| 1,384,417 | 7/1921 | Weichhart | 81—53 |
| 2,178,298 | 10/1939 | Bowan | 81—53 |
| 2,622,466 | 12/1952 | Vanden Bos et al. | 81—53 |
| 2,637,232 | 5/1953 | McKean | 81—53 |

WILLIAM FELDMAN, *Primary Examiner.*

JAMES L. JONES, Jr., *Examiner.*